United States Patent
Oohara et al.

(10) Patent No.: US 7,941,076 B2
(45) Date of Patent: May 10, 2011

(54) ROTOR DRIVING FORCE TRANSMISSION DEVICE AND IMAGE FORMING APPARATUS HAVING THE DEVICE

(75) Inventors: Shunichi Oohara, Hitachinaka (JP); Marutomo Gotou, Hitachinaka (JP)

(73) Assignee: Ricoh Company, Ltd., Tokyo (JP)

( * ) Notice: Subject to any disclaimer, the term of this patent is extended or adjusted under 35 U.S.C. 154(b) by 324 days.

(21) Appl. No.: 12/200,580

(22) Filed: Aug. 28, 2008

(65) Prior Publication Data

US 2009/0060578 A1    Mar. 5, 2009

(30) Foreign Application Priority Data

Aug. 30, 2007 (JP) ................. 2007-224522

(51) Int. Cl.
  *G03G 15/00* (2006.01)
(52) U.S. Cl. ........................................ 399/167
(58) Field of Classification Search .......... 399/167, 399/116, 117, 159; 464/37, 158; 74/411
  See application file for complete search history.

(56) References Cited

U.S. PATENT DOCUMENTS

| 2,987,158 | A | * | 6/1961 | Kiekhaefer | |
| 3,013,411 | A | * | 12/1961 | Wahlmark | 464/158 |
| 3,557,633 | A | * | 1/1971 | Frerichs | 74/411 |
| 3,916,713 | A | * | 11/1975 | Young | 74/411 |
| 4,073,160 | A | * | 2/1978 | Perret | 464/158 |
| 4,702,122 | A | * | 10/1987 | Richard | 464/37 |
| 2001/0008590 | A1 | * | 7/2001 | Katada et al. | 399/167 |

FOREIGN PATENT DOCUMENTS

| JP | 8-270642 A | 10/1996 |
| JP | 2001-228661 A | 8/2001 |
| JP | 2004-61594 A | 2/2004 |
| JP | 2007-139005 A | 6/2007 |

* cited by examiner

*Primary Examiner* — Susan S Lee
(74) *Attorney, Agent, or Firm* — Crowell & Moring LLP (57) ABSTRACT

A driving force transmission device superior in reliability with suppressed rotation fluctuation. The driving force transmission device has gearing reception portions, three arm portions and a press member. The gearing reception portions are formed in the inner circumference of a rotor. The arm portions extend from a shaft radially. The arm portions can be elastically deformed. The arm portions have engagement tooth portions for transmitting a driving force of the shaft to the rotor. The press member presses the rotor to bend the arm portions in the direction where the rotor is pressed. In that state, the gearing reception portions gear with the engagement tooth portions.

20 Claims, 10 Drawing Sheets

ROTOR DRIVING FORCE TRANSMISSION DEVICE AND IMAGE FORMING APPARATUS HAVING THE DEVICE

FIELD OF THE INVENTION

The present invention relates to a rotor driving force transmission device for transmitting a driving force to a rotor such as a photoconductor drum, and an image forming apparatus provided with the driving force transmission device.

BACKGROUND OF THE INVENTION

Figure 13:
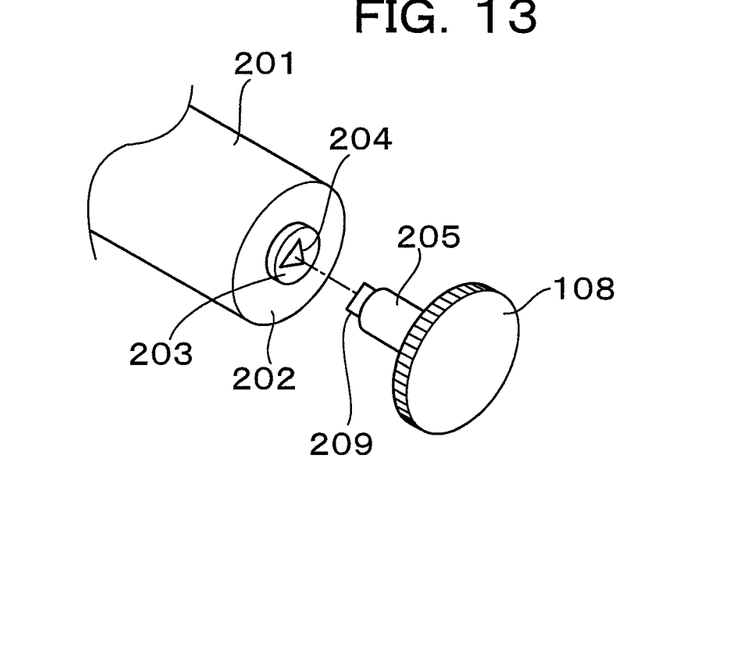
FIG. 13 is a partially perspective view of a driving force transmission device proposed in the background art.
Figure 14:
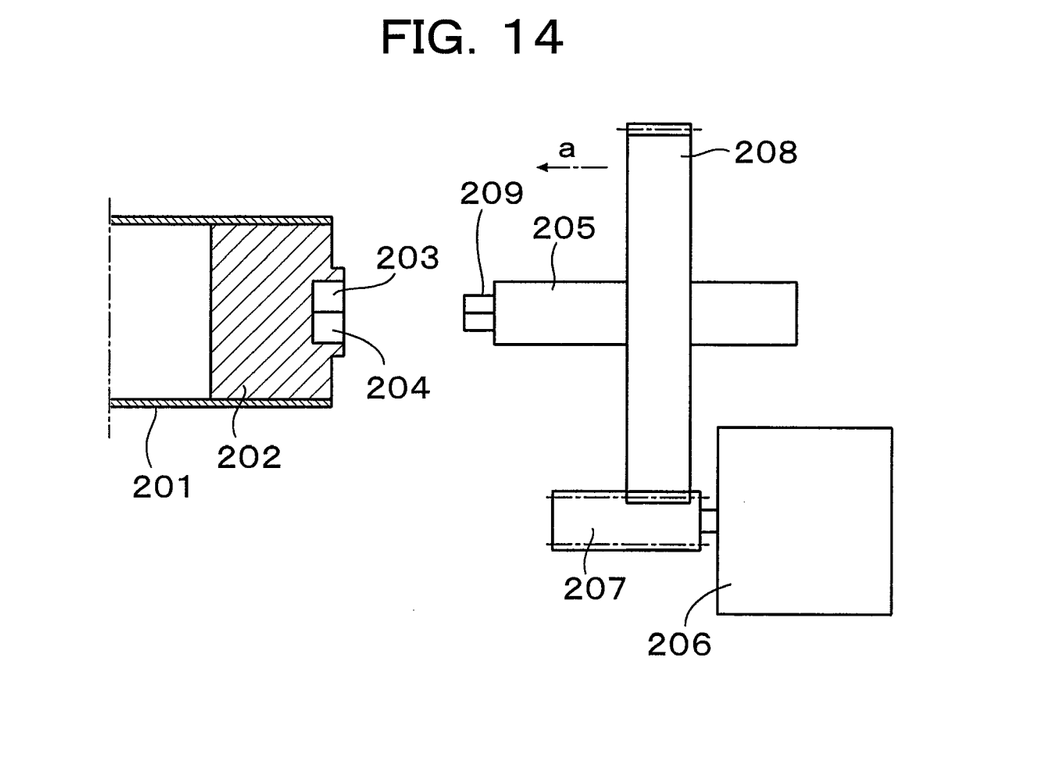
FIG. 14 is a schematic configuration view of the background-art driving force transmission device.
Figure 15A:
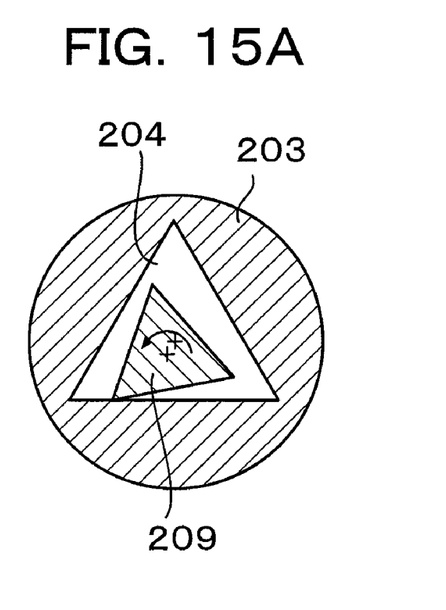
FIGS. 15A and 15B are explanatory views of a coupling unit in the background-art driving force transmission device.
Figure 15B:
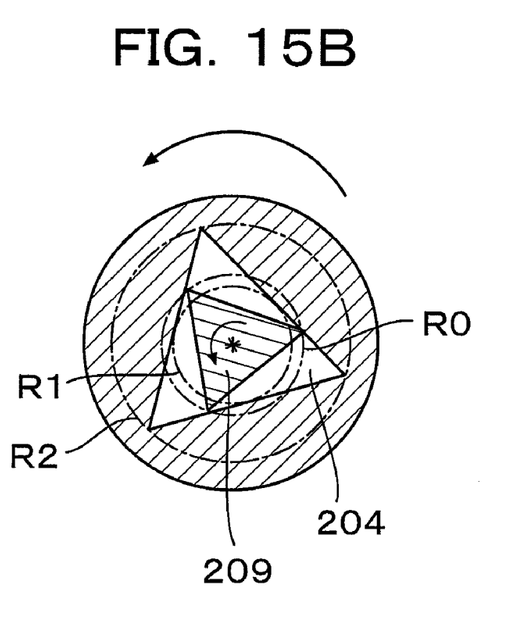

FIGS. 13, 14, 15A and 15B are views for explaining a driving force transmission device for transmitting a driving force to a photoconductor drum according to the background art as disclosed in JP-A-8-270642. FIG. 13 is a partial perspective view of the driving force transmission device. FIG. 14 is a schematic configuration view of the driving force transmission device. FIGS. 15A and 15B are explanatory views of a coupling unit in the driving force transmission device.

In the driving force transmission device, a cartridge-side coupling unit is provided in one end portion of a photoconductor drum 201. In the coupling unit, a coupling recessed shaft 203 is provided in a flange 202 fixedly attached to the end portion of the photoconductor drum 201. A recess 204 is formed in a central portion of an end surface of the recessed shaft 203.

On the other hand, a body-side coupling unit is provided on the body side of the image forming apparatus. In the coupling unit, a coupling protruding shaft 205 is provided in a position corresponding to the rotation axis of the photoconductor drum 201. As shown in FIG. 14, torque is transmitted from a pinion gear 207 of a motor 206 to the protruding shaft 205 through a gear 208. A protrusion 209 is provided in a tip portion of the protruding shaft 205.

The gear 208 is fixedly attached to the coupling protruding shaft 205. The gear 208 and the pinion gear 207 constitute a helical gear. The helical gear has a gear configuration in which thrust in a direction of the arrow a of FIG. 14 can be generated in the gear 208 when the coupling protruding shaft 205 is rotated in a direction in which the photoconductor drum 201 should rotate to form an image thereon. By this thrust, the protrusion 209 provided in the tip portion of the protruding shaft 205 is inserted into the recess 204 provided on the photoconductor drum 201 side. Thus, the recessed shaft 203 and the protruding shaft 205 engage with each other.

As shown in FIGS. 14 and 15A, the protrusion 209 is shaped into an equilateral triangle pole, and the recess 204 has a shape bored in an equilateral triangle pole which is large enough to insert the protrusion 209 thereto.

The cross-sectional triangle of the protrusion 209 and the cross-sectional triangle of the recess 204 have a relationship as shown in FIG. 15B. That is, the triangles satisfy the relation of $D_1 < D_0 < D_2$ when $D_0$ designates the diameter of a circumscribed circle $R_0$ of the triangle of the protrusion 209, $D_1$ designates the diameter of an inscribed circle $R_1$ of the triangle of the recess 204, and $D_2$ designates the diameter of a circumscribed circle $R_2$ of the triangle of the recess 204.

Patent Document 1: JP-A-8-270642

In an electrophotographic image forming apparatus, an electrostatic latent image is formed on a photoconductor drum by laser scanning, and toner is applied to the latent image by a developing unit so as to form a toner image. The toner image is transferred to an intermediate transfer belt by a first transfer unit. The toner image is transferred from the intermediate transfer belt to paper by a second transfer unit. In such an electrophotographic image forming apparatus, it is necessary to drive and rotate the photoconductor drum at a constant angular velocity. When the angular velocity of the photoconductor drum changes, the position where the image will be exposed on the photoconductor will be shifted. Thus, unevenness will appear in density if the image is monochrome. If the image is a full-color image, misalignment will appear when a plurality of colors are superimposed on the intermediate transfer belt. Thus, color shift will occur.

The photoconductor drum deteriorates with age in its electrostatic characteristic, which will affect abrasion or exposure of its photosensitive layer. Therefore, the photoconductor drum is generally set as a replaceable part. The photoconductor drum is removably supported on an image forming apparatus body.

In view of cost and mounting accuracy, a driving system including a driving shaft, a motor, etc. for the photoconductor drum is not made replaceable but fixed to the image forming apparatus body. An encoder can be attached to detect the angular velocity of the driving shaft. Thus, the driving shaft can be controlled to rotate at a constant angular velocity. However, the driving force transmission device may have looseness. Even if the driving shaft rotates at a constant angular velocity, fluctuation may occur in the angular velocity of the photoconductor drum due to the looseness of the driving force transmission device. Thus, the aforementioned image deterioration such as density unevenness or color shift may occur.

The aforementioned background-art driving force transmission device shown in FIGS. 13, 14, 15A and 15B has a shape with looseness where the recess 204 and the protrusion 209 can come in contact at three points. The recess 204 and the protrusion 209 are pressed on each other by a driving force so that driving and transmission can be stabilized. However, the driving force transmission device configured thus may be affected by an external force applied perpendicularly to its axis. In such a case, the contact cannot be stabilized. The angular velocity which should be transmitted to the photoconductor drum 201 may be fluctuated. Thus, there is a problem in operational reliability as a driving force transmission device.

SUMMARY OF THE INVENTION

A first object of the present invention is to provide a rotor driving force transmission device which can solve the forgoing problems in the background art and which can suppress the fluctuation of the angular velocity of a rotor and is superior in operational reliability.

A second object of the present invention is to provide an image forming apparatus which can solve the forgoing problems in the background art without causing image deterioration such as density unevenness or color shift.

In order to attain the aforementioned first object, a first configuration of the present invention provides a rotor driving force transmission device having a cylindrical rotor, and a shaft disposed inside the rotor and for driving the rotor to thereby rotate the rotor. The rotor is attached removably in a direction of an axis of the shaft. The rotor driving force transmission device is characterized by including:

a large number of gearing reception portions which are coupled integrally with the rotor and formed along an inner circumference of the rotor;

at least three arm portions which are disposed radially from the shaft toward the gearing reception portions so that the arm portions can be elastically deformed along the axis of the shaft, each of the arm portions including an engagement tooth portion which is disposed in a tip portion thereof and which can gear with one of the gearing reception portions so as to transmit a driving force of the shaft to the rotor; and a press member which presses the rotor toward gearing portions where the gearing reception portions and the engagement tooth portions gear with each other; wherein:

a relation of D1<D2 is established where D1 designates a diameter of a virtual circle formed by connecting contact points between the engagement tooth portions and the gearing reception portions when the rotor has been attached to gear the gearing reception portions with the engagement tooth portions, and D2 designates a diameter of a virtual circumscribed circle formed by connecting tips of the engagement tooth portions when the rotor has not been attached yet; and the rotor is pressed toward the gearing portions by the press member so that the gearing reception portions gear with the engagement tooth portions while the arm portions are bent in a direction where the rotor is pressed.

In order to attain the first object, a second configuration of the present invention provides a rotor driving force transmission device has a cylindrical rotor, and a shaft disposed inside the rotor and for driving the rotor to thereby rotate the rotor. The rotor is attached removably in a direction of an axis of the shaft. The rotor driving force transmission device is characterized by including:

a large number of gearing reception portions which are coupled integrally with the rotor and formed along an inner circumference of the rotor;

at least three arm portions which are disposed radially from the shaft toward the gearing reception portions and rotatably supported on the shaft so that the arm portions can be elastically deformed along the axis of the shaft, each of the arm portions including a first engagement tooth portion which is disposed in a tip portion thereof and which can gear with one of the gearing reception portions;

a press member which presses the rotor toward gearing portions where the gearing reception portions and the first engagement tooth portions gear with each other; and a transmission member which is coupled with the shaft and which extends toward the gearing reception portions and has an outer circumferential portion including at least three second engagement tooth portions to gear with the gearing reception portions so as to transmit a driving force of the shaft to the rotor; wherein:

a relation of D3<D1<D2 is established where D1 designates a diameter of a virtual circle formed by connecting contact points between the first engagement tooth portions and the gearing reception portions when the rotor has been attached to gear the gearing reception portions with the first engagement tooth portions, D2 designates a diameter of a virtual circumscribed circle formed by connecting tips of the first engagement tooth portions when the rotor has not been attached yet, and D3 designates a diameter of a virtual circle formed by connecting tips of the second engagement tooth portions of the transmission member; and the rotor is pressed toward the gearing portions by the press member so that the gearing reception portions gear with the first engagement tooth portions while the arm portions are bent in a direction where the rotor is pressed.

According to a third configuration of the present invention, the rotor driving force transmission device according to the first or second configuration is characterized in that a slope is formed in each of the engagement tooth portions of the arm portions, and the slope is inclined in a direction where the gearing reception portion gearing with the engagement tooth portion is pressed therein.

According to a fourth configuration of the present invention, the rotor driving force transmission device according to the first or second configuration is characterized in that torsion control members are provided in the arm portions respectively, and the torsion control members are connected with one another by connection members which can be deformed by bending.

According to a fifth configuration of the present invention, the rotor driving force transmission device according to the first configuration is characterized in that a shaft coupling portion coupled integrally with the shaft is provided so that the elastic portions are put between the shaft coupling portion and base portions of the arm portions respectively.

According to a sixth configuration of the present invention, the rotor driving force transmission device according to the fifth configuration is characterized in that the arm portions, the elastic portions and the shaft coupling portion are formed integrally.

According to a seventh configuration of the present invention, the rotor driving force transmission device according to any one of the first to sixth configuration is characterized by further including a motor which drives and rotates the shaft, an encoder which is attached to the shaft so as to detect a rotational velocity of the shaft, and a control unit which controls a rotational velocity of the motor based on a detection signal from the encoder.

In order to attain the second object, an eighth configuration of the present invention provides an image forming apparatus including a photoconductor drum, a charger for charging a surface of the photoconductor drum, an exposure unit for forming an electrostatic latent image on the charged surface of the photoconductor drum, a developing unit for applying toner to the electrostatic latent image so as to form a toner image, a transfer unit for transferring the toner image onto a recording medium, and a fixing unit for fixing the toner image, which has been transferred on the recording medium, to the recording medium. The image forming apparatus is characterized in that:

a shaft for driving and rotating the photoconductor drum is supported on an apparatus body, and the photoconductor drum is removably attached to the shaft; and the photoconductor drum is a rotor according to any one of the first to seventh configurations, and the photoconductor drum is driven and rotated by a rotor driving force transmission device according to any one of the first to seventh configurations, so as to form an image.

The aforementioned first to seventh configurations of the present invention can provide a rotor driving force transmission device which can suppress the fluctuation of the angular velocity of a rotor and is superior in operational reliability.

The aforementioned eighth configuration of the present invention can provide an image forming apparatus causing no image deterioration such as density unevenness or color shift.

BRIEF DESCRIPTION OF THE DRAWINGS

FIGS. 3A-3C are views showing in detail the vicinities of an engagement tooth portion in the driving force transmission device.

FIGS. 8A-8C are views showing in detail the vicinities of an engagement tooth portion in the driving force transmission device according to the third embodiment.

FIGS. 10A and 10B are views showing in detail the vicinities of an engagement tooth portion in the driving force transmission device according to the fourth embodiment.

DETAILED DESCRIPTION OF THE EMBODIMENTS

Next, embodiments of the present invention will be described with reference to the drawings.

First Embodiment

Figure 1:
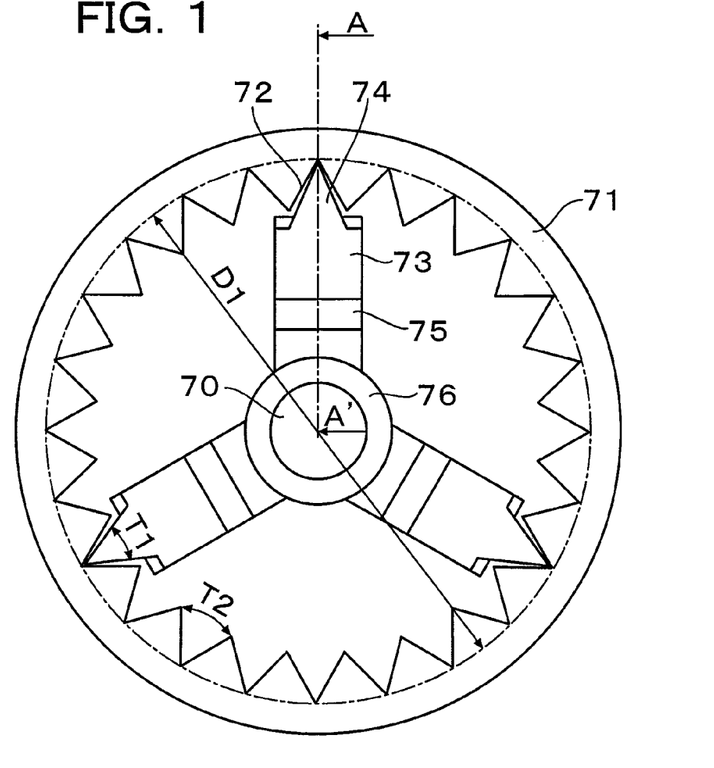
FIG. 1 is a side view where a driving force transmission device according to a first embodiment of the present invention is viewed axially.
Figure 2:
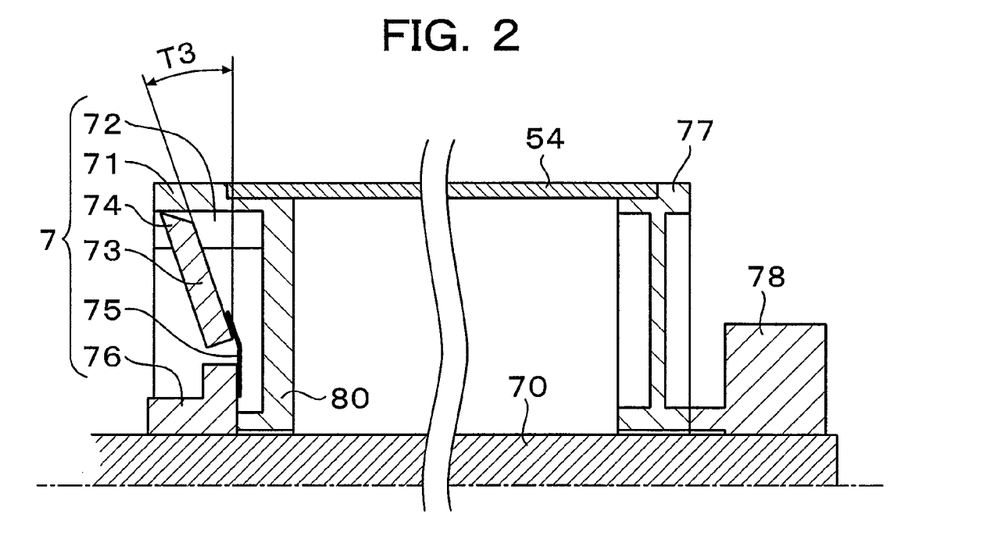
FIG. 2 is a sectional view taken on line A-A' in FIG. 1.

FIG. 1 is a side view where a driving force transmission device according to a first embodiment of the present invention is viewed axially. FIG. 2 is a sectional view taken on line A-A' in FIG. 1. FIG. 2 shows a cylindrical rotor all over its width.

The cylindrical rotor in this embodiment is a photoconductor drum 54, which is composed of a hollow cylinder of aluminum or the like. A photosensitive layer is formed in the surface of the photoconductor drum 54.

A driving force transmission device 7 has a gearing flange 71, gearing reception portions 72, arm portions 73, engagement tooth portions 74, elastic portions 75 each composed of a leaf spring, a shaft coupling portion 76, a flange 77 (see FIG. 2), a press member 78 (see FIG. 2), etc.

The gearing flange 71 has a cylindrical shape and is mechanically coupled with one end portion of the photoconductor drum 54 by strong fitting as shown in FIG. 2. As shown in FIG. 1, the tooth-like gearing reception portions 72 are formed at a predetermined pitch in the inner circumference of a left opening portion of the gearing flange 71. As shown in FIG. 2, an inner circumferential portion 80 inside the gearing flange 71 is fitted to a shaft 70 loosely with a slight clearance.

As shown in FIG. 1, a plurality (three in this embodiment) of arm portions 73 are disposed at even intervals inside the gearing flange 71 so as to extend radially from the shaft 70 toward the gearing reception portions 72. Base portions of the arm portions 73 are coupled with the shaft coupling portion 76 through the elastic portions 75 respectively. The shaft coupling portion 76 is strongly fitted to the shaft 70 by press fitting.

An engagement tooth portion 74 is formed in a tip portion of each arm portion 73. As shown in FIG. 1, a relation of T1<T2 is established between a tip angle T1 of each engagement tooth portion 74 and an opening angle T2 of a recess of each gearing reception portion 72. The tip portion of the engagement tooth portion 74 elastically gears with the gearing reception portion 72.

As shown in FIG. 2, the flange 77 is coupled integrally with the other opening end portion of the photoconductor drum 54 on the opposite side to the gearing flange 71. For example, the press member 78 has an internal thread portion which can gear with an external thread portion of the shaft 70. When the press member 78 screwed down to the shaft 70 is rotated, the press member 78 presses the flange 77. Thus, the integral portion of the photoconductor drum 54, the gearing flange 71 and the flange 77 is pressed toward the driving force transmission device 7.

The gearing flange 71 and the flange 77 of the integral portion are fitted to the shaft 70 so loosely with a clearance not longer than 100 μm that the photoconductor drum 54 can be removed from the shaft 70. FIGS. 1 and 2 show the state where the photoconductor drum 54 has been attached. In FIGS. 1 and 2, the photoconductor drum 54 (the internal circumference portion 80 of the gearing flange 71) is pressed onto the shaft coupling portion 76 by the press member 78.

Figure 3A:
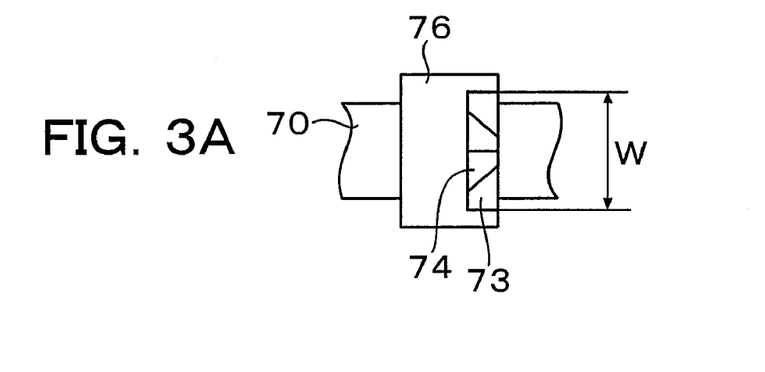
FIG. 3A is a view from above the engagement tooth portion.
Figure 3B:
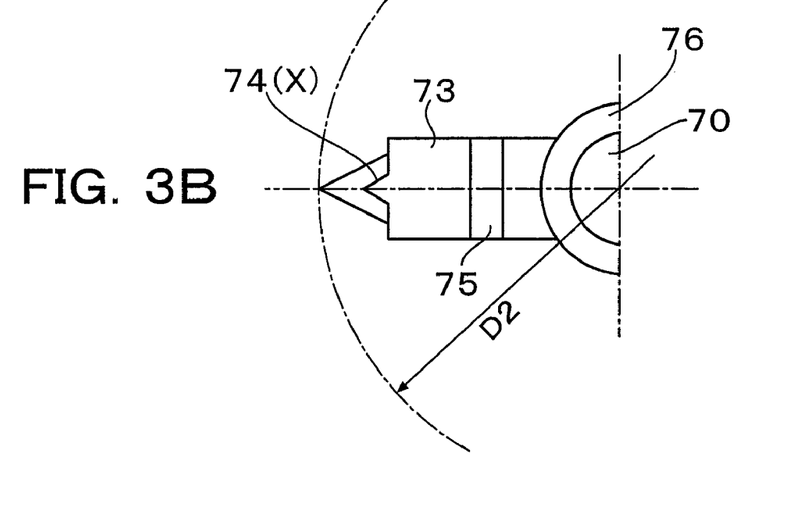
FIG. 3B is a view from the axis of a shaft.
Figure 3C:
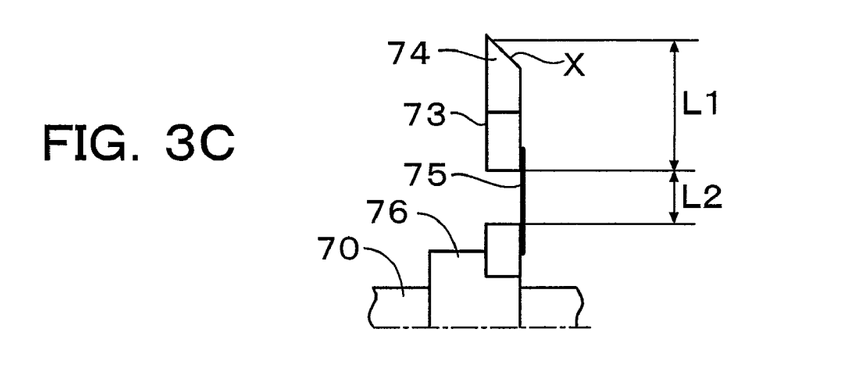
FIG. 3C is a view from a side of FIG. 3A.

FIGS. 3A-3C are views showing in detail the vicinities of an engagement tooth portion 74. FIG. 3A is a view from above the engagement tooth portion 74. FIG. 3B is a view from the axis of the shaft 70. FIG. 3C is a view from a side of FIG. 3A. Each of FIGS. 3A-3C shows the state where the photoconductor drum 54 has not been attached.

As shown in FIG. 3C, each engagement tooth portion 74 has a tooth face X inclined in a direction where the gearing reception portion 72 is pressed. Thus, the engagement tooth portion 74 can gear with the gearing reception portion 72 smoothly. In the state where the photoconductor drum 54 has not been set in the driving force transmission device 7, each arm portion 73 and its corresponding elastic portion 75 stand perpendicularly to the axis of the shaft 70 (see FIG. 3C). In this state, a diameter D2 (see FIG. 3B) of a virtual circumscribed circle formed by connecting the tips of the engagement tooth portions 74 is designed to be larger than a diameter D1 (see FIG. 1) of a virtual circle formed by connecting contact points between the gearing reception portions 72 and the engagement tooth portions 74 when the photoconductor drum 54 has been attached (D1<D2).

As shown in FIG. 2, when the integral portion of the photoconductor drum 54, the gearing flange 71 and the flange 77 is pushed and fitted in along the axis of the shaft 70, the arm portions 73 supported by the elastic portions 75 fall in the direction where the photoconductor drum 54 is pushed. Thus, the diameter D2 is reduced so that the arm portions 73 gear with the gearing reception portions 72.

As shown in FIG. 2, assume that the arm portion 73 is tilted at an angle T3 when the photoconductor drum 54 has been attached. In this case, when WS designates the force to tilt the arm portion 73, a force WR with which the engagement tooth portion 74 presses the gearing reception portion 72 can be expressed by:

$$WS \times \cos(T3)/\sin(T3)$$

When the tilt angle T3 is, for example, 6°, WR can be expressed by WS×9.5. For this reason, even if the pushing force WS is small, the force WR with which the engagement tooth portion 74 presses the gearing reception portion 72 radially can be made large. Thus, torque can be transmitted precisely without generating looseness in the gearing portion in spite of an external force which may be applied thereto.

Specifically in FIG. 3C, a distance L1 between the lower end of the arm portion 73 and the tip of the engagement tooth portion 74 is set to 30 mm, a distance L2 between the lower end of the arm portion 73 and the upper end of the shaft coupling portion 76 is set to 10 mm, and a width W of the arm portion 73 is set to 20 mm. A stainless steel plate (Young's modulus: 2,100 kgf/mm$^2$) 0.1 mm thick is used as the elastic portion 75. When D1 and D2 are set to 90 mm and about 90.3 mm respectively, the tilt angle T3 reaches about 6°. In this case, the force to tilt one arm portion 73 reaches 0.5 N, and the force to press the gearing reception portion 72 reaches about 5 N. When the number of arm portions 73 is three, the pressing force reaches 1.5 N, and the force to press each gearing reception portion 72 radially reaches about 5 N. Thus, each gearing portion can bear an external force. There is no fear that looseness is generated.

Figure 4A:
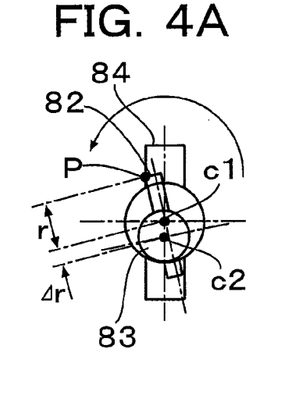
FIGS. 4A-4C are views for explaining influence of looseness of the driving force transmission device.
Figure 4B:
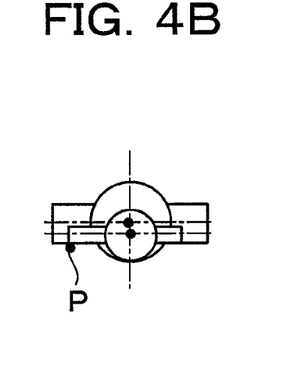
Figure 4C:
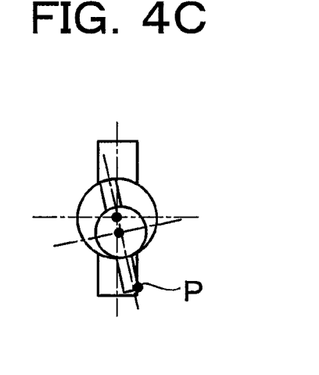

FIGS. 4A-4C are views for explaining influence of looseness in the driving force transmission device 7, which has a structure as follows. That is, a pin 82 is coupled with a shaft 83 perpendicularly thereto so that a driving force from the shaft 83 can be transmitted to a cylindrical-rotor-side reception portion 84 through the pin 82. The shaft 83 rotates in the illustrated arrow direction. FIG. 4B shows the shaft 83 rotated at 90° from that in FIG. 4A, and FIG. 4C shows the shaft 83 rotated likewise from that in FIG. 4B.

When there is a misalignment Δr between a rotation enter c1 of the shaft 82 and a rotation center c2 of the cylindrical rotor due to looseness, the radius of a contact point p between the pin 82 and the reception portion 84 from the rotation center c2 changes in accordance with rotation. Therefore, an angular velocity ω' of the cylindrical rotor changes with respect to an angular velocity ω of the shaft 82 as:

$$\omega' = \omega \times \{r + \Delta r \times \sin(\omega T)\}/r$$

Thus, even if the shaft 82 rotates at a constant velocity, the cylindrical rotor connected thereto will have a fluctuation in its angular velocity. The fluctuation depends on the ratio of the radius of the contact point p to the looseness. The smaller the radius of the contact point p is, the larger the fluctuation caused by the looseness is. For example, when the radius of the contact point p is 10 mm, the fluctuation of the angular velocity will reach 1% even if the looseness is 0.1 mm.

In this embodiment, the contact points between the engagement tooth portions 74 and the gearing reception portions 72 are designed to be in the outer circumferential portion of the cylindrical rotor. Thus, the fluctuation of rotation can be reduced even if looseness occurs. When the diameter of the virtual circle formed by connecting the contact points is 90 mm (the radius is 45 mm) as in this embodiment, the fluctuation of rotation will be 0.2% if the looseness is 0.1 mm.

According to this embodiment, as has been described, the gearing flange 71 and the flange 77 have looseness with respect to the shaft 70, and the photoconductor drum 54 is removably attached to the shaft 70. In spite of such a configuration, there is no looseness between each engagement tooth portion 74 and its corresponding gearing reception portion 72 that are transmitting a driving force. Thus, the driving force can be transmitted precisely without fluctuation in the transmitted angular velocity.

Second Embodiment

Figure 5:
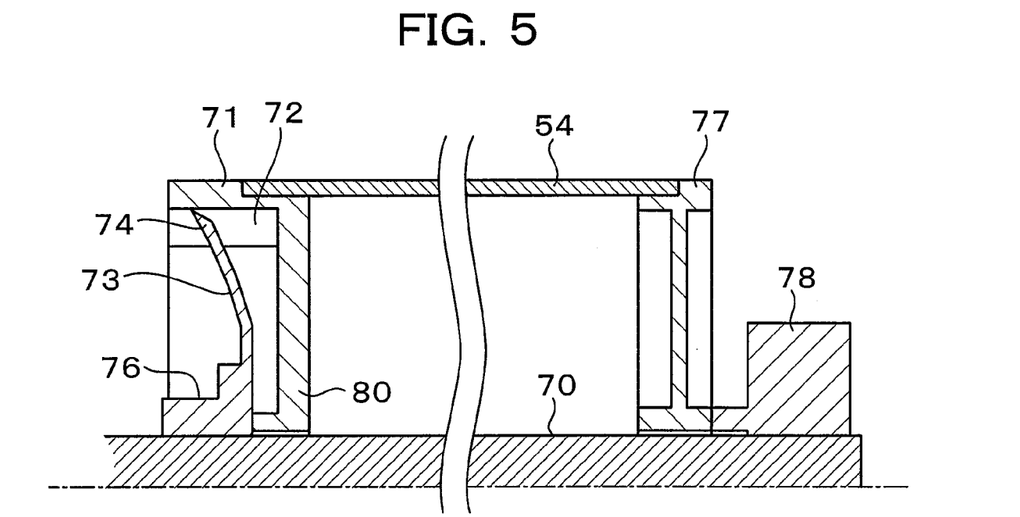
FIG. 5 is a sectional view of a driving force transmission device according to a second embodiment of the present invention.

FIG. 5 is a sectional view of a driving force transmission device according to a second embodiment of the present invention. This embodiment is different from the first embodiment at the point that each arm portion 73 also serves as an elastic portion. Due to this configuration, the arm portions 73, the engagement tooth portions 74 and the shaft coupling portion 76 can be formed integrally out of engineering plastic or the like. Thus, the device can be simplified.

Specifically, the width of each arm portion 73 is set to 20 mm, the length of the arm portion 73 including the engagement tooth portion 74 is set to 33 mm, and the thickness of the arm portion 73 is set to 1 mm. Engineering plastic whose Young's modulus is 300 kgf/mm$^2$ is used. When D1 and D2 are set to 90 mm and about 90.3 mm respectively, the tilt angle T3 is about 6°. In this case, the force to tilt one arm portion 73 reaches 1 N, and the force to radially press the gearing reception portion 72 reaches about 10 N.

According to this embodiment, the driving force transmission device can transmit a driving force precisely without looseness and without fluctuation in a transmitted angular velocity in spite of the simple configuration of the driving force transmission device.

Third Embodiment

Figure 6:
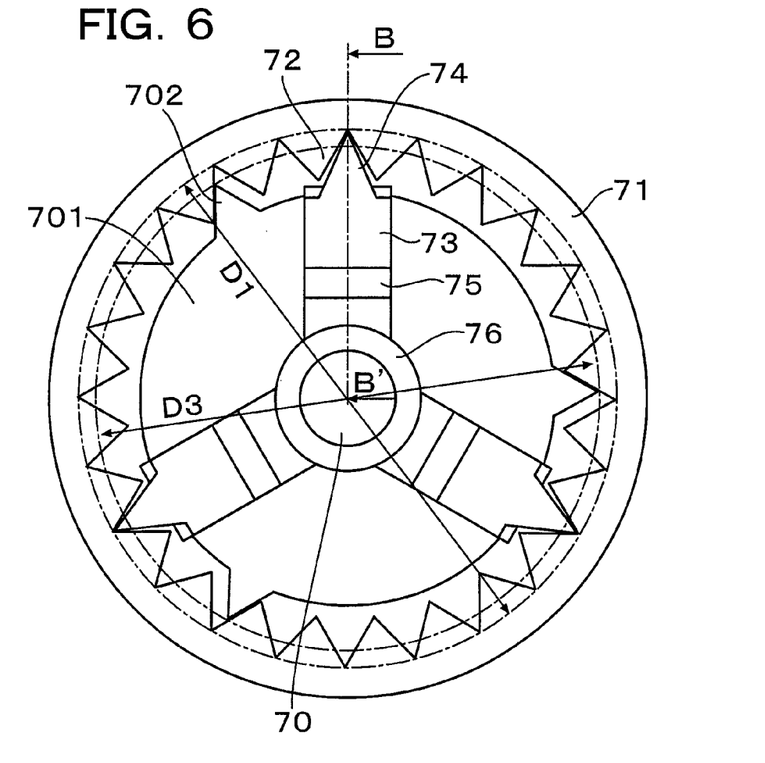
FIG. 6 is a side view where a driving force transmission device according to a third embodiment of the present invention is viewed axially.
Figure 7:
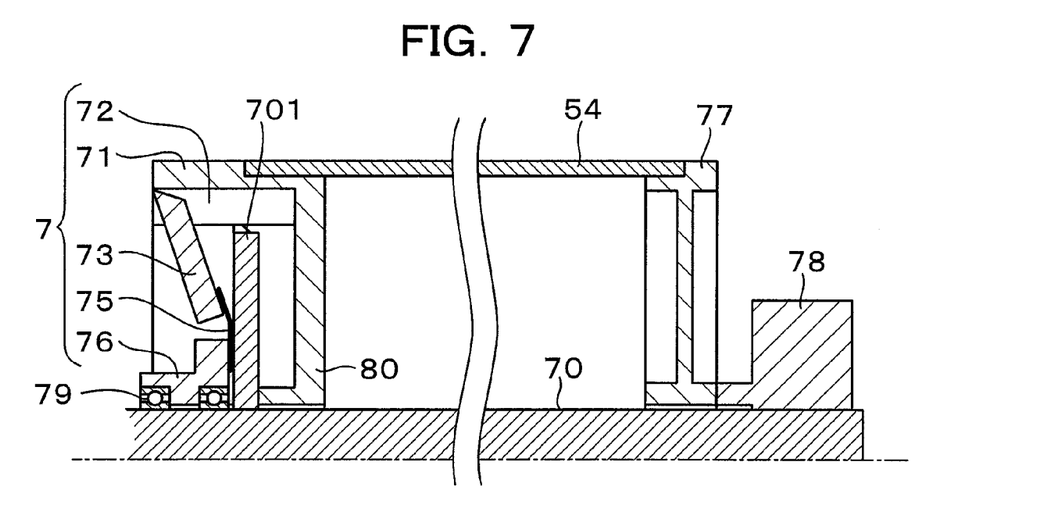
FIG. 7 is a sectional view taken on line B-B' in FIG. 6.

FIG. 6 is a side view where a driving force transmission device according to a third embodiment of the present invention is viewed axially. FIG. 7 is a sectional view taken on line B-B' in FIG. 6.

This embodiment is different from the first embodiment at the following points. The first point is that the shaft coupling portion 76 supporting the arm portions 73 is rotatably supported on the shaft 70 by a bearing 79. The second point is that a disc-like transmission member 701 is coupled with an outer circumferential portion of the shaft 70, at least three second engagement tooth portions 702 are provided in an outer circumferential portion of the transmission member 701, and the second engagement tooth portions 702 also gear with the gearing reception portions 72.

The transmission member 701 is coupled integrally with the shaft 70 by strong fitting. As shown in FIG. 6, the positions where the engagement tooth portions 74 serving as first engagement tooth portions gear with the gearing reception portions 72 are shafted slightly from the positions where the second engagement tooth portions 702 gear with the gearing reception portions 72.

A diameter D3 of a virtual circle formed by connecting the tips of the second engagement tooth portions 702 is smaller than the diameter D1 of the virtual circle formed by connecting the contact points between the engagement tooth portions 74 and the gearing reception portions 72. That is, the relation of D3<D1<D2 is established.

Accordingly, the second engagement tooth portions 702 stabilize the rotation center of the photoconductor drum 54 without disturbing the contact between the engagement tooth portions 74 and the gearing reception portions 72. Thus, there is no fear that fluctuation in angular velocity is caused by the misalignment between the rotation center of the shaft 70 and the rotation center of the photoconductor drum 54 as shown in FIGS. 4A-4C.

Figures 8A, 8B:
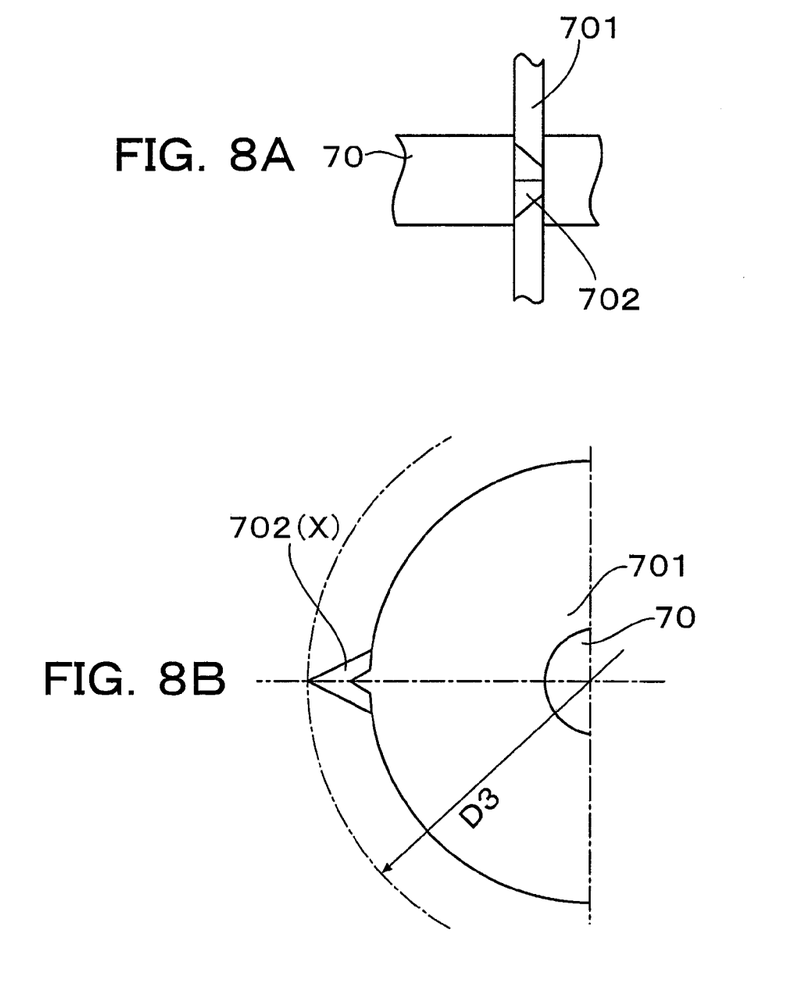
FIG. 8A is a view from above the engagement tooth portion.
FIG. 8B is a view from the axis of a shaft.
Figure 8C:
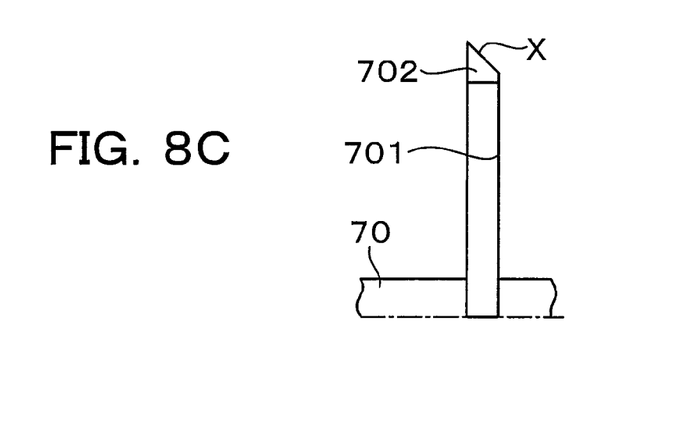
FIG. 8C is a view from a side of FIG. 8A.

FIGS. 8A-8C are views showing in detail the vicinities of a second engagement tooth portion 702. FIG. 8A is a view from above the second engagement tooth portion 702. FIG. 8B is a view from the axis of the shaft 700. FIG. 8C is a view from a side of FIG. 8A. Each of FIGS. 8A-8C shows the state where the photoconductor drum 54 has not been attached.

Each second engagement tooth portion 702 has a tooth face X inclined in a direction where the gearing reception portion 72 is pressed. Thus, the second engagement tooth portion 702 is formed so that the second engagement tooth portion 702 can begin to gear with the gearing reception portion 72 smoothly.

In the configuration according to this embodiment, the bearing 79 placed between the shaft 70 and the shaft coupling portion 76 prevents any force in the rotation direction from being transmitted to any arm portion 73 or any elastic portion 75, but the driving force of the shaft 70 is transmitted to the photoconductor drum 54 through the second engagement tooth portions 702. Accordingly, any arm portion 73 or any elastic portion 75 can be prevented from being deformed due to the force in the rotation direction. Thus, the photoconductor drum 54 can be supported more precisely, so that the driving force can be transmitted more precisely and higher torque can be transmitted.

Fourth Embodiment

Figure 9:
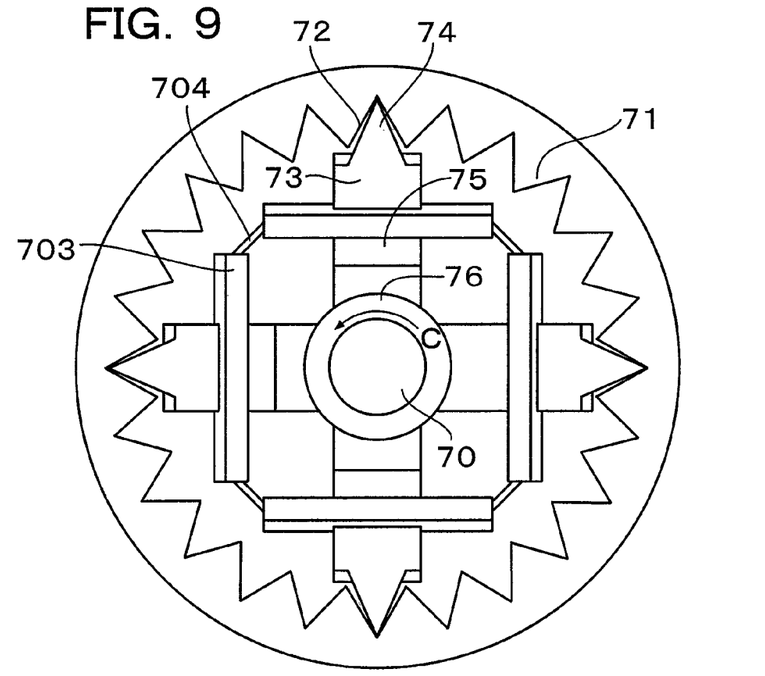
FIG. 9 is a side view where a driving force transmission device according to a fourth embodiment of the present invention is viewed axially.
Figure 10A:
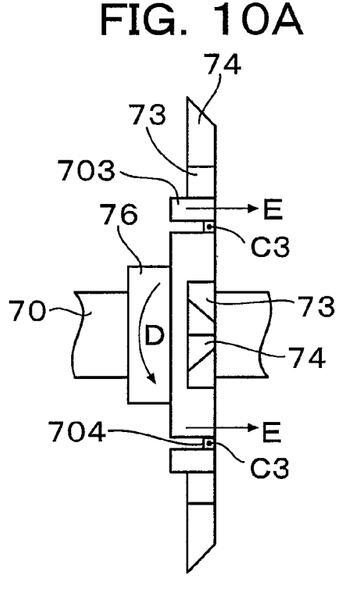
FIG. 10A is a view from above the engagement tooth portion.
Figure 10B:
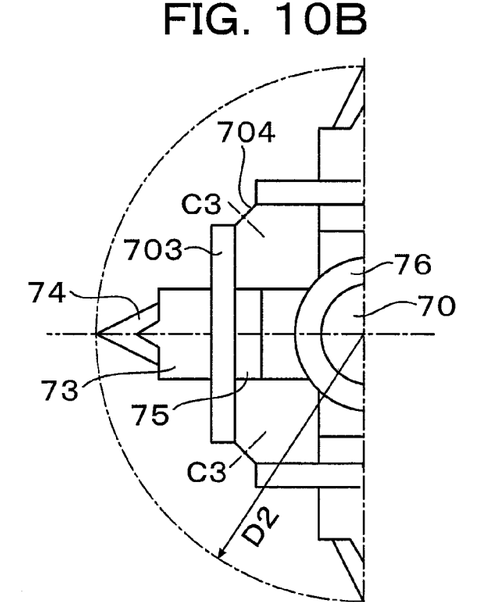
FIG. 10B is a view from the axis of a shaft.

FIG. 9 is a side view where a driving force transmission device according to a fourth embodiment of the present invention is viewed axially. FIGS. 10A and 10B are views showing in detail the vicinities of an engagement tooth portion 74. FIG. 10A is a view from above the engagement tooth portion 74, and FIG. 10B is a view from the axis of the shaft 70.

This embodiment is different from the first embodiment at the following point. That is, a plurality (four in this embodiment) of torsion control members 703 corresponding to the number of arm portions 73 are provided in the arm portions 73 respectively so that each torsion control member 703 extends perpendicularly to the axis of the shaft 70 and the axis of its corresponding arm portion 73. The torsion control members 703 are connected to one another in their end portions through connection members 704 which can be deformed by bending.

In each arm portion 73, the contact point between the engagement tooth portion 74 and the gearing reception portion 72 is shafted axially from the elastic portion 75 as shown in FIG. 2. Therefore, when a driving force is transmitted in the direction of the arrow C illustrated in FIG. 9, a moment in the direction of the arrow D illustrated in FIG. 10A is generated in the arm portion 73. When the driving force to be transmitted increases, a torsion occurs in the direction of the illustrated arrow D. Torsional deformation of the arm portion 73 is very slight, but it causes displacement of the contact point between the engagement tooth portion 74 and the gearing reception portion 72.

In order prevent the torsion, the torsion control members 703 are attached to base end portions of the arm portions 703 respectively. The connection members 704 which can be deformed by bending are connected to the end portions of the torsion control members 703. Torsion of each arm portion 73 shifts the end position of its corresponding torsion control member 703 in the direction of the arrow E illustrated in FIG. 10A. However, the torsion control members 703 are connected to one another through the connection members 704 so that displacements in the direction of the arrow E are controlled with each other (moments are cancelled by each other). Thus, no torsion occurs in the direction of the illustrated direction D.

Each torsion control member 703 is made so wide in the direction of the illustrated arrow E as to withstand the moment in the direction of the illustrated arrow D. On the other hand, each connection member 704 connecting the torsion control members 703 with each other is made so narrow in the direction of the arrow E as to reduce its flexural rigidity around the axis C3 in order to prevent the rigidity from increasing too much when the arm portion 73 is inclined as shown in FIG. 2. With this configuration, an excessive force can be prevented from being applied to the photoconductor drum 54 when the photoconductor drum 54 is pressed by the press member 78. Thus, the arm portions 73 can be inclined to gear the engagement tooth portions 74 with the gearing reception portions 72 without looseness.

According to this embodiment, even if a driving force to be transmitted increases, the arm portions 73 have no torsion, and the contact points between the engagement tooth portions 74 and the gearing reception portions 72 are not displaced. Thus, the driving force can be transmitted more precisely.

Fifth Embodiment

Figure 11:
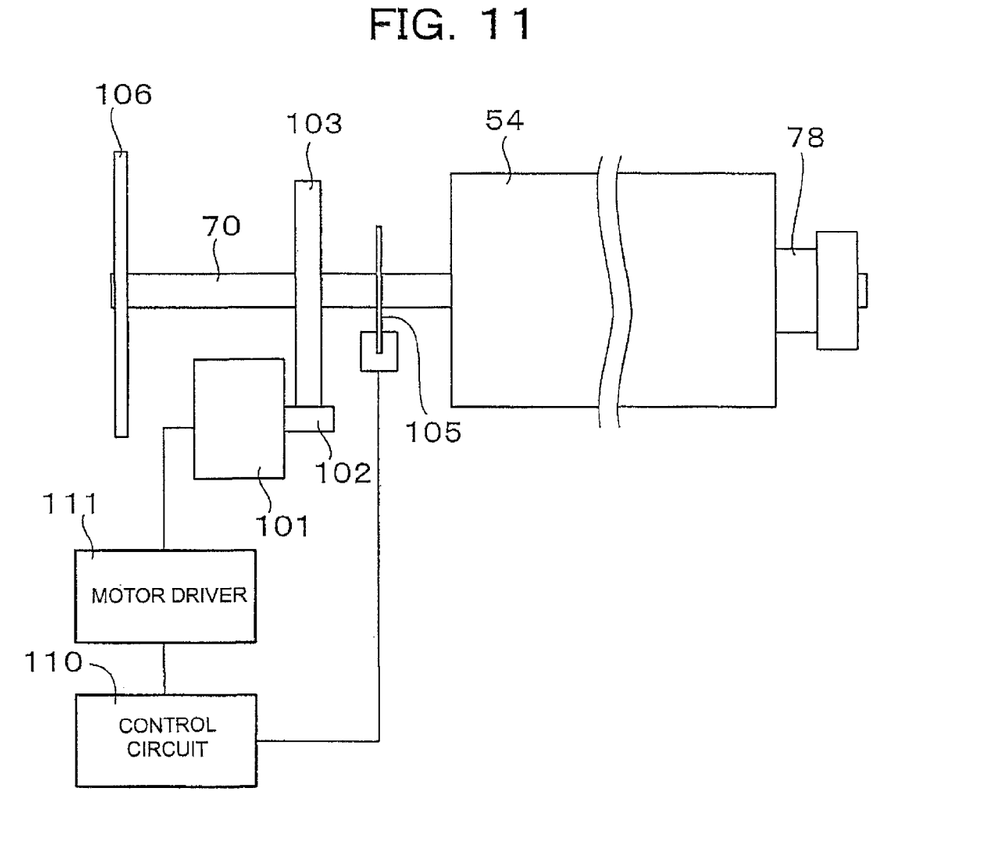
FIG. 11 is a schematic configuration diagram showing the configuration of the other portions of the driving force transmission devices according to the first to fourth embodiments of the present invention.

FIG. 11 is a schematic configuration diagram showing the configuration of the other portions of the driving force transmission devices according to the first to fourth embodiments of the present invention.

As shown in FIG. 11, an encoder 105 is attached to the shaft 70, and a control circuit 110 and a motor driver 111 are provided. A motor gear 102 provided in a motor 101 gears with a gear 103 so as to rotate the shaft 70. A flywheel 106 is attached to the shaft 106 so as to reduce fluctuation of rotation whose frequency is not lower than 100 Hz. It is difficult to suppress the fluctuation of such rotation by control. In FIG. 11, the reference numeral 54 represents a photoconductor drum, and 78 represents a press member.

Based on a detection signal of the encoder 105, the control circuit 110 performs feed-back or feed-forward control to rotate the shaft 70 at a constant angular velocity.

A driving mechanism using a gear for speed reduction can generate high torque on the shaft 70 in spite of a small-size motor. Such a driving mechanism is superior in small size, low cost and low power consumption. However, angular velocity fluctuation occurs due to a mounting error of the gear, a cumulative pitch error of teeth of the gear, an error of tooth space run-out, etc. The angular velocity fluctuation is detected by the encoder 105 attached to the shaft 70, and control is performed to reduce the fluctuation. Thus, the shaft 70 is rotated with high precision.

The driving force transmission device according to any one of the first to fourth embodiments is attached to the driving mechanism, and the photoconductor drum 54 is driven and rotated. Thus, the angular velocity fluctuation of the photoconductor drum 54 can be prevented, and the photoconductor drum 54 can be rotated with high precision.

Figure 12:
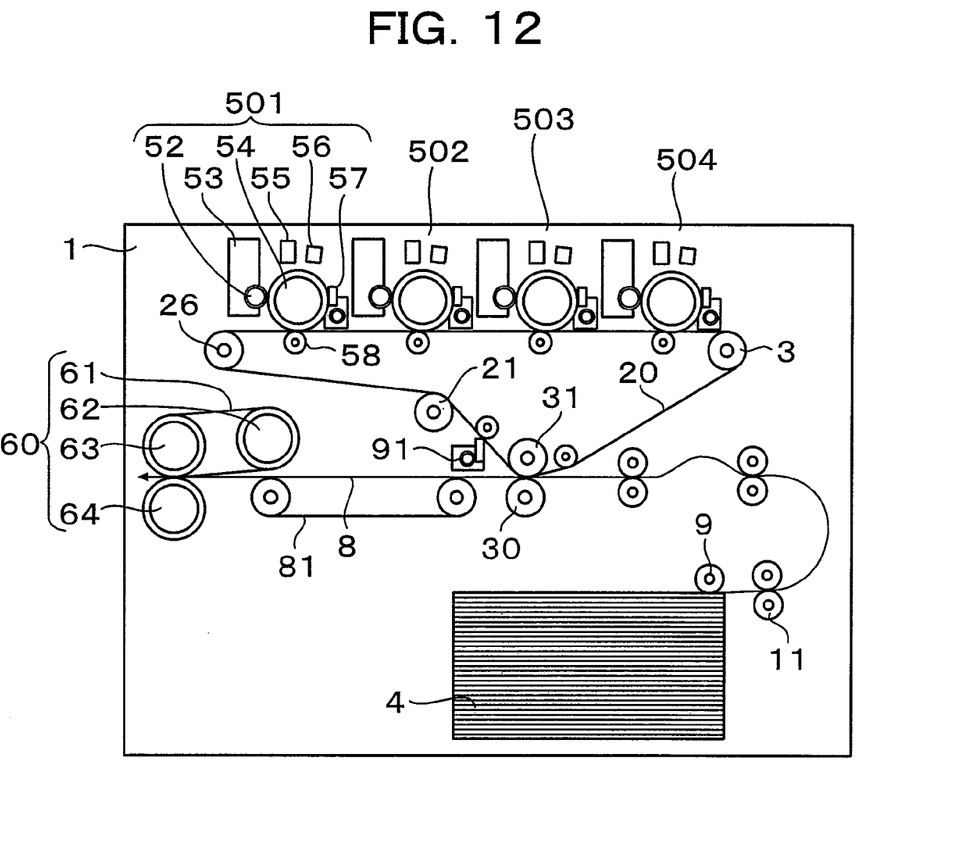
FIG. 12 is a schematic configuration diagram of an exemplary apparatus of an image forming apparatus to which the present invention is applied.

FIG. 12 is a schematic configuration diagram of the whole of an apparatus as an example of an image forming apparatus to which the present invention is applied.

In an image forming apparatus 1, developing units 501-504 for respective colors are disposed above an intermediate transfer belt 20. Color images of toners are formed on the intermediate transfer belt 20. The color images are transferred to paper conveyed from a paper stack unit 4. The toners are fused and fixed by heat and pressure by a fixing unit 60. Thus, a color image is formed.

The number of the developing units 501-504 is four, that is, a K developing unit 501 with a black toner, a C developing unit 502 with a cyan toner, an M developing unit 503 with a magenta toner, and a Y developing unit 504 with a yellow toner.

Each developing unit 501-504 is constituted by a toner hopper 53 for storing toner, a developing roller 52 for forming a toner layer and bringing the toner into contact with a photoconductor drum 54, a drum cleaner 57 for cleaning the surface of the photoconductor drum 54, a charger 55 for charging the surface of the photoconductor drum 54, and an exposure unit 56 for writing an electrostatic latent image on the photoconductor drum 54. The photoconductor drum 54 for each color is driven and rotated by the driving force transmission device according to any one of the first to fourth embodiments.

The intermediate transfer belt 20 is set up by a plurality of rollers 3, 21, 26 and 31. The intermediate transfer belt 20 is driven and conveyed by one of the rollers, that is, the driving roller 3. A belt cleaner 91 removes toners remaining on the intermediate transfer belt 20. Primary transfer rollers 58 are disposed inside the intermediate transfer belt 20 so as to face the photoconductor drums 54 respectively.

A paper conveyance path 8 leaves the paper stack unit 4 with a stack of paper, passes through a pickup roller 9 and separation rollers 11, runs between a secondary transfer roller 7 and the intermediate transfer belt 20, and reaches the fixing unit 60 through a conveyance belt 80.

The fixing unit 60 has a fixing belt 61, a heating roller 62, an elastic roller 63, a backup roller 64, etc. The fixing belt 61 is set up by the elastic roller 63 and the heating roller 62, and conveyed by rotation of the heating roller 62 or another roller. Paper is pressed onto the elastic roller 63 side by the backup roller 64. The heating roller 62 has a heating means such as a halogen heater in a hollow metal shaft. The heating roller 62 heats the fixing belt 61. The surface of the elastic roller 63 is formed out of an elastic material such as silicon rubber. A nip portion pressed by the backup roller 64 is convex on the side of the elastic roller 63. Thus, the paper can be prevented from being wound around the fixing belt 61.

To form an image, a photosensitive layer on the photoconductor drum 54 is charged by the charger 56 and irradiated with light corresponding to image information by the exposure unit 55. Thus, the potential in the surface of the photoconductor drum 54 is dropped down so as to form an electrostatic latent image. By the rotation of the photoconductor drum 54, the electrostatic latent image arrives at the position of the developing roller 52. When the electrostatic latent image comes into contact with a toner layer, charged toner adheres onto the electrostatic latent image.

A toner image formed on the photoconductor drum 54 thus is transferred onto the intermediate transfer belt 20 in a nip portion where the primary transfer roller 58 presses the intermediate transfer belt 20.

Toner images on the photoconductor drums 54 of the developing units 501-504 are transferred onto the intermediate transfer belt 20 by the primary transfer rollers 58. Thus, color toner images are formed. The toner images on the intermediate transfer belt 20 conveyed to the secondary transfer roller 30 are transferred onto paper conveyed thereto. The paper to which the toner images have been transferred is conveyed to the fixing unit 60 by a conveyance belt 81. In the fixing unit 60, toners are fused and fixed by heat and pressure. Thus, a color image is formed.

In this embodiment, though the photoconductor drum 54 is removably attached, there is no fluctuation in its rotation due to the looseness of the driving force transmission device. Thus, a high-quality image with no density unevenness or no color shift can be obtained.

In the aforementioned embodiments, description was made about transmission of a driving force to a cylindrical rotor such as a photoconductor drum. The present invention is not limited to such transmission. The present invention can be also applied to transmission of a driving force to a polygon rotor such as a polygon mirror.

What is claimed is:

1. A rotor driving force transmission device comprising:
   a cylindrical rotor;
   a shaft which is disposed inside the rotor and for driving the rotor to thereby rotate the rotor, the rotor being attached removably in a direction of an axis of the shaft;
   a large number of gearing reception portions which are coupled integrally with the rotor and formed along an inner circumference of the rotor;
   at least three arm portions which are disposed radially from the shaft toward the gearing reception portions so that the arm portions can be elastically deformed along the axis of the shaft, each of the arm portions including an engagement tooth portion which is disposed in a tip portion thereof and which can gear with one of the gearing reception portions so as to transmit a driving force of the shaft to the rotor; and
   a press member which presses the rotor toward gearing portions where the gearing reception portions and the engagement tooth portions gear with each other;
   wherein:
   a relation of $D1<D2$ is established where D1 designates a diameter of a virtual circle formed by connecting contact points between the engagement tooth portions and the gearing reception portions when the rotor has been attached to gear the gearing reception portions with the engagement tooth portions, and D2 designates a diameter of a virtual circumscribed circle formed by connecting tips of the engagement tooth portions when the rotor has not been attached yet; and
   the rotor is pressed toward the gearing portions by the press member so that the gearing reception portions gear with the engagement tooth portions while the arm portions are bent in a direction where the rotor is pressed.

2. A rotor driving force transmission device according to claim 1, wherein a slope is formed in each of the engagement tooth portions of the arm portions, and the slope is inclined in a direction where the gearing reception portion gearing with the engagement tooth portion is pressed therein.

3. A rotor driving force transmission device according to claim 2, further comprising:
   a motor which drives and rotates the shaft;
   an encoder which is attached to the shaft so as to detect a rotational velocity of the shaft; and
   a control unit which controls a rotational velocity of the motor based on a detection signal from the encoder.

4. An image forming apparatus comprising:
   a photoconductor drum;
   a charger for charging a surface of the photoconductor drum;
   an exposure unit for forming an electrostatic latent image on the charged surface of the photoconductor drum;
   a developing unit for applying toner to the electrostatic latent image so as to form a toner image;
   a transfer unit for transferring the toner image onto a recording medium; and
   a fixing unit for fixing the toner image, which has been transferred on the recording medium, to the recording medium; wherein:

a shaft for driving and rotating the photoconductor drum is supported on an apparatus body, and the photoconductor drum is removably attached to the shaft; and the photoconductor drum is driven and rotated by a rotor driving force transmission device according to claim 2, so as to form an image.

5. A rotor driving force transmission device according to claim 1, wherein torsion control members are provided in the arm portions respectively, and the torsion control members are connected with one another by connection members which can be deformed by bending.

6. A rotor driving force transmission device according to claim 5, further comprising:
 a motor which drives and rotates the shaft;
 an encoder which is attached to the shaft so as to detect a rotational velocity of the shaft; and
 a control unit which controls a rotational velocity of the motor based on a detection signal from the encoder.

7. An image forming apparatus comprising:
 a photoconductor drum;
 a charger for charging a surface of the photoconductor drum;
 an exposure unit for forming an electrostatic latent image on the charged surface of the photoconductor drum;
 a developing unit for applying toner to the electrostatic latent image so as to form a toner image;
 a transfer unit for transferring the toner image onto a recording medium; and
 a fixing unit for fixing the toner image, which has been transferred on the recording medium, to the recording medium; wherein:
 a shaft for driving and rotating the photoconductor drum is supported on an apparatus body, and the photoconductor drum is removably attached to the shaft; and
 the photoconductor drum is driven and rotated by a rotor driving force transmission device according to claim 5, so as to form an image.

8. A rotor driving force transmission device according to claim 1, wherein a shaft coupling portion coupled integrally with the shaft is provided so that elastic portions are put between the shaft coupling portion and base portions of the arm portions respectively.

9. A rotor driving force transmission device according to claim 8, wherein the arm portions, the elastic portions and the shaft coupling portion are formed integrally.

10. An image forming apparatus comprising:
 a photoconductor drum;
 a charger for charging a surface of the photoconductor drum;
 an exposure unit for forming an electrostatic latent image on the charged surface of the photoconductor drum;
 a developing unit for applying toner to the electrostatic latent image so as to form a toner image;
 a transfer unit for transferring the toner image onto a recording medium; and
 a fixing unit for fixing the toner image, which has been transferred on the recording medium, to the recording medium; wherein:
 a shaft for driving and rotating the photoconductor drum is supported on an apparatus body, and the photoconductor drum is removably attached to the shaft; and
 the photoconductor drum is driven and rotated by a rotor driving force transmission device according to claim 9, so as to form an image.

11. A rotor driving force transmission device according to claim 8, further comprising:
 a motor which drives and rotates the shaft;
 an encoder which is attached to the shaft so as to detect a rotational velocity of the shaft; and
 a control unit which controls a rotational velocity of the motor based on a detection signal from the encoder.

12. An image forming apparatus comprising:
 a photoconductor drum;
 a charger for charging a surface of the photoconductor drum;
 an exposure unit for forming an electrostatic latent image on the charged surface of the photoconductor drum;
 a developing unit for applying toner to the electrostatic latent image so as to form a toner image;
 a transfer unit for transferring the toner image onto a recording medium; and
 a fixing unit for fixing the toner image, which has been transferred on the recording medium, to the recording medium; wherein:
 a shaft for driving and rotating the photoconductor drum is supported on an apparatus body, and the photoconductor drum is removably attached to the shaft; and
 the photoconductor drum is driven and rotated by a rotor driving force transmission device according to claim 8, so as to form an image.

13. A rotor driving force transmission device according to claim 1, further comprising:
 a motor which drives and rotates the shaft;
 an encoder which is attached to the shaft so as to detect a rotational velocity of the shaft; and
 a control unit which controls a rotational velocity of the motor based on a detection signal from the encoder.

14. An image forming apparatus comprising:
 a photoconductor drum;
 a charger for charging a surface of the photoconductor drum;
 an exposure unit for forming an electrostatic latent image on the charged surface of the photoconductor drum;
 a developing unit for applying toner to the electrostatic latent image so as to form a toner image;
 a transfer unit for transferring the toner image onto a recording medium; and
 a fixing unit for fixing the toner image, which has been transferred on the recording medium, to the recording medium; wherein:
 a shaft for driving and rotating the photoconductor drum is supported on an apparatus body, and the photoconductor drum is removably attached to the shaft; and
 the photoconductor drum is driven and rotated by a rotor driving force transmission device according to claim 13, so as to form an image.

15. An image forming apparatus comprising:
 a photoconductor drum;
 a charger for charging a surface of the photoconductor drum;
 an exposure unit for forming an electrostatic latent image on the charged surface of the photoconductor drum;
 a developing unit for applying toner to the electrostatic latent image so as to form a toner image;
 a transfer unit for transferring the toner image onto a recording medium; and
 a fixing unit for fixing the toner image, which has been transferred on the recording medium, to the recording medium; wherein:
 a shaft for driving and rotating the photoconductor drum is supported on an apparatus body, and the photoconductor drum is removably attached to the shaft; and the photoconductor drum is driven and rotated by a rotor driving force transmission device according to claim 1, so as to form an image.

16. A rotor driving force transmission device comprising:

a cylindrical rotor;

a shaft which is disposed inside the rotor and for driving the rotor to thereby rotate the rotor, the rotor being attached removably in a direction of an axis of the shaft;

a large number of gearing reception portions which are coupled integrally with the rotor and formed along an inner circumference of the rotor;

at least three arm portions which are disposed radially from the shaft toward the gearing reception portions and rotatably supported on the shaft so that the arm portions can be elastically deformed along the axis of the shaft, each of the arm portions including a first engagement tooth portion which is disposed in a tip portion thereof and which can gear with one of the gearing reception portions;

a press member which presses the rotor toward gearing portions where the gearing reception portions and the first engagement tooth portions gear with each other; and a transmission member which is coupled with the shaft and which extends toward the gearing reception portions and has an outer circumferential portion including at least three second engagement tooth portions to gear with the gearing reception portions so as to transmit a driving force of the shaft to the rotor; wherein:

a relation of D3<D1<D2 is established where D1 designates a diameter of a virtual circle formed by connecting contact points between the first engagement tooth portions and the gearing reception portions when the rotor has been attached to gear the gearing reception portions with the first engagement tooth portions, D2 designates a diameter of a virtual circumscribed circle formed by connecting tips of the first engagement tooth portions when the rotor has not been attached yet, and D3 designates a diameter of a virtual circle formed by connecting tips of the second engagement tooth portions of the transmission member; and the rotor is pressed toward the gearing portions by the press member so that the gearing reception portions gear with the first engagement tooth portions while the arm portions are bent in a direction where the rotor is pressed.

17. A rotor driving force transmission device according to claim 16, wherein a slope is formed in each of the engagement tooth portions of the arm portions, and the slope is inclined in a direction where the gearing reception portion gearing with the engagement tooth portion is pressed therein.

18. A rotor driving force transmission device according to claim 16, wherein torsion control members are provided in the arm portions respectively, and the torsion control members are connected with one another by connection members which can be deformed by bending.

19. A rotor driving force transmission device according to claim 16, further comprising:

a motor which drives and rotates the shaft;

an encoder which is attached to the shaft so as to detect a rotational velocity of the shaft; and a control unit which controls a rotational velocity of the motor based on a detection signal from the encoder.

20. An image forming apparatus comprising:

a photoconductor drum;

a charger for charging a surface of the photoconductor drum;

an exposure unit for forming an electrostatic latent image on the charged surface of the photoconductor drum;

a developing unit for applying toner to the electrostatic latent image so as to form a toner image;

a transfer unit for transferring the toner image onto a recording medium; and a fixing unit for fixing the toner image, which has been transferred on the recording medium, to the recording medium; wherein:

a shaft for driving and rotating the photoconductor drum is supported on an apparatus body, and the photoconductor drum is removably attached to the shaft; and the photoconductor drum is driven and rotated by a rotor driving force transmission device according to claim 16, so as to form an image.

* * * * *